United States Patent
Stenstrom

(10) Patent No.: US 6,419,042 B1
(45) Date of Patent: Jul. 16, 2002

(54) INTEGRATED ELECTRIC POWER HYDRAULIC STEERING SYSTEM

(75) Inventor: Craig A. Stenstrom, Ortonville, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/677,964

(22) Filed: Oct. 3, 2000

(51) Int. Cl.[7] .............................. B62D 5/06; B62D 5/08; B62D 5/04
(52) U.S. Cl. ..................... 180/417; 180/428; 180/441; 180/442; 180/444
(58) Field of Search ................................ 180/417, 428, 180/441, 442, 444, 65.6

(56) References Cited

U.S. PATENT DOCUMENTS

| | | | |
|---|---|---|---|
| 4,114,720 A | * | 9/1978 | Ericson et al. ............... 180/442 |
| 5,113,960 A | * | 5/1992 | Prinz ......................... 180/65.6 |
| 5,156,229 A | | 10/1992 | Yasui et al. |
| 5,159,553 A | | 10/1992 | Karnopp et al. |
| 5,307,892 A | | 5/1994 | Phillips |
| 5,558,177 A | | 9/1996 | Inaguma et al. |
| 5,692,883 A | | 12/1997 | Voure'h |
| 5,810,568 A | | 9/1998 | Whitefield et al. |
| 5,813,488 A | * | 9/1998 | Weiss ......................... 180/65.6 |
| 6,029,768 A | * | 2/2000 | Kiyosawa .................... 180/444 |
| 6,039,143 A | * | 3/2000 | Kielar et al. ................. 180/444 |
| 6,076,628 A | * | 6/2000 | Pattok et al. ................ 180/444 |
| 6,155,376 A | * | 12/2000 | Cheng ......................... 180/444 |
| 6,196,345 B1 | * | 3/2001 | Lyons et al. ............... 180/65.6 |

* cited by examiner

Primary Examiner—Brian L. Johnson
Assistant Examiner—Matthew Luby
(74) Attorney, Agent, or Firm—Tarolli, Sundheim, Covell, Tummino & Szabo L.L.P.

(57) ABSTRACT

An electric powered hydraulic steering system (10) for a vehicle comprises a power steering motor (12) having a housing (18) with an exterior surface (16) and an interior chamber (24). The power steering motor (12) further includes a rack bar (26) for turning the steerable wheels of the vehicle. The rack bar (26) extends through the interior chamber (24) of the housing (18). A piston (34) is attached to the rack bar (26) and divides the interior chamber (24) into two chamber portions (38 and 40) for receiving a fluid. The piston (34) moves the rack bar (26) linearly within the interior chamber (24) depending upon a pressure differential between the two chamber portions (38 and 40). The system (10) further includes a control valve (54) for directing the fluid into the chamber portions (38 and 40) in the housing (18) of the power steering motor (12), a pump (56) for supplying the fluid to the control valve (54), a reservoir (58) for providing the fluid to the pump (56), and an electric motor (60) for driving the pump (56). The power steering motor, control valve, pump, reservoir, and electric motor form an integrated unit.

13 Claims, 2 Drawing Sheets

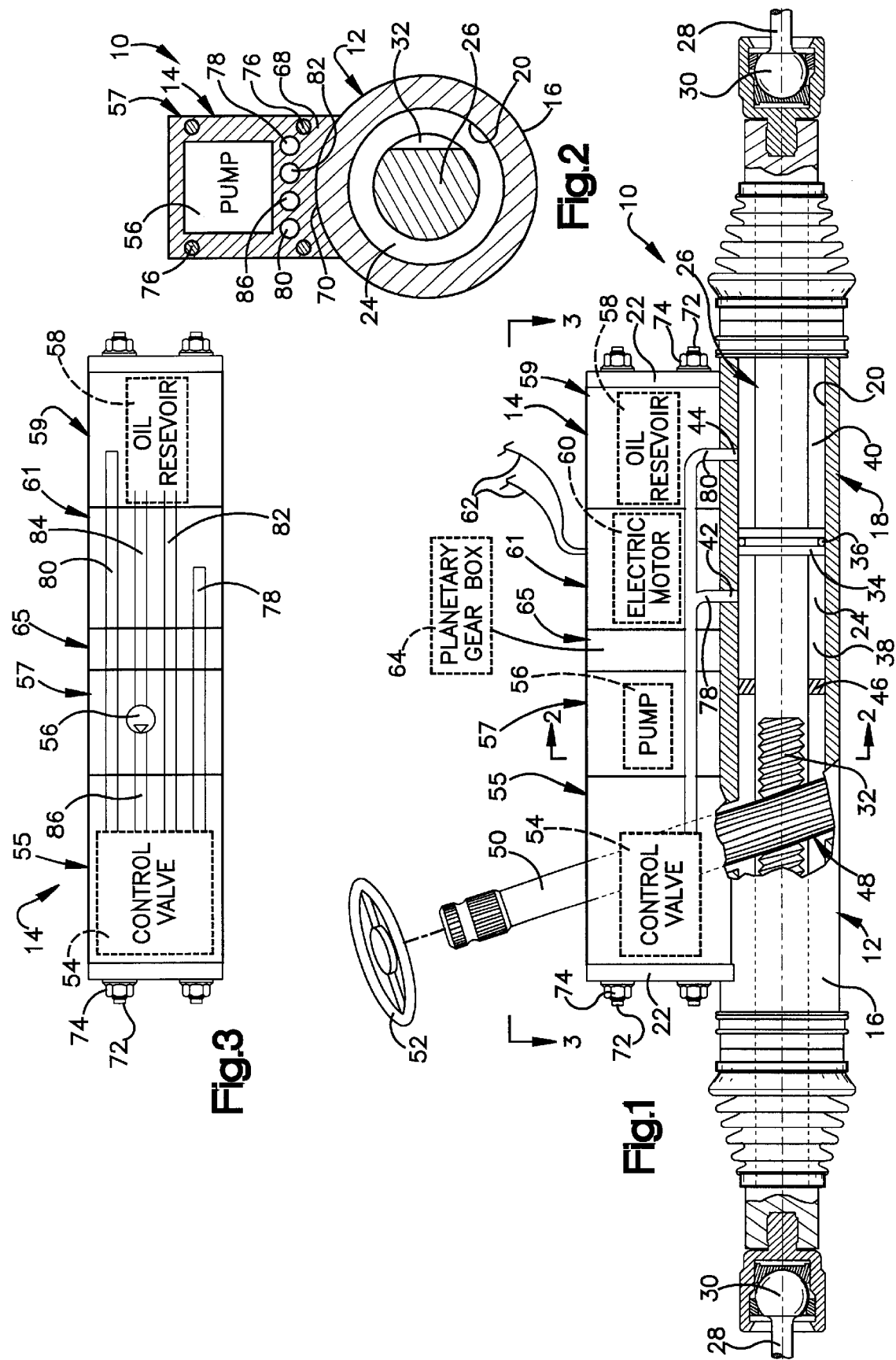

INTEGRATED ELECTRIC POWER HYDRAULIC STEERING SYSTEM

TECHNICAL FIELD

The present invention relates to a power steering system for a vehicle and, more particularly, to an electric powered hydraulic steering system.

BACKGROUND OF THE INVENTION

A known power steering system for a vehicle has a power steering motor with an interior chamber. A rack bar for turning the steerable wheels of the vehicle extends through the interior chamber. A piston is attached to the rack bar and the piston divides the interior chamber into two variable volume chamber portions. The piston moves linearly within the interior chamber depending upon a pressure differential between the two chamber portions.

A fluid is supplied to the two chamber portions of the power steering motor from a pump. The pump is driven by an electric motor. When driven, the pump draws hydraulic fluid from a reservoir and directs the fluid to a manually actuated power steering control valve. The control valve controls the fluid flow into the chamber portions of the power steering motor.

Such a power steering system generally includes separate system components that must be individually mounted to a vehicle. The vehicle manufacturer must mount the components of the system and connect the components to form the assembled power steering system in a vehicle.

The individual components of the power steering system may include a first component comprising a power steering motor and a manually actuated control valve, and a second component that includes a reservoir and an electric motor driven pump. The two components are mounted to a vehicle, and conduits hydraulically connect the components.

SUMMARY OF THE INVENTION

The present invention is an electric powered hydraulic steering system for a vehicle. The system comprises a power steering motor having a housing with an exterior surface and an interior chamber. The power steering motor further includes a rack bar for turning the steerable wheels of the vehicle. The rack bar extends through the interior chamber of the housing. A piston is attached to the rack bar and divides the interior chamber into two chamber portions for receiving fluid. The piston moves the rack bar linearly within the interior chamber depending upon a pressure differential between the two chamber portions. The system further includes a control valve for directing the fluid into the chamber portions in the housing of the power steering motor, a pump for supplying the fluid to the control valve, a reservoir for providing the fluid to the pump, and an electric motor for driving the pump. The power steering motor, control valve, pump, reservoir, and electric motor are an integrated unit.

BRIEF DESCRIPTION OF THE DRAWINGS

The foregoing and other features of the present invention will become apparent to those skilled in the art to which the present invention relates upon reading the following description of the invention with reference to the accompanying drawings, in which:

FIG. 1 is a schematic sectional view of an electric powered hydraulic steering system embodying the present invention;

FIG. 2 is a sectional view taken along line 2—2 in FIG. 1;

FIG. 3 is a view taken along line 3—3 in FIG. 1;

DESCRIPTION OF PREFERRED EMBODIMENT

Figure 4:
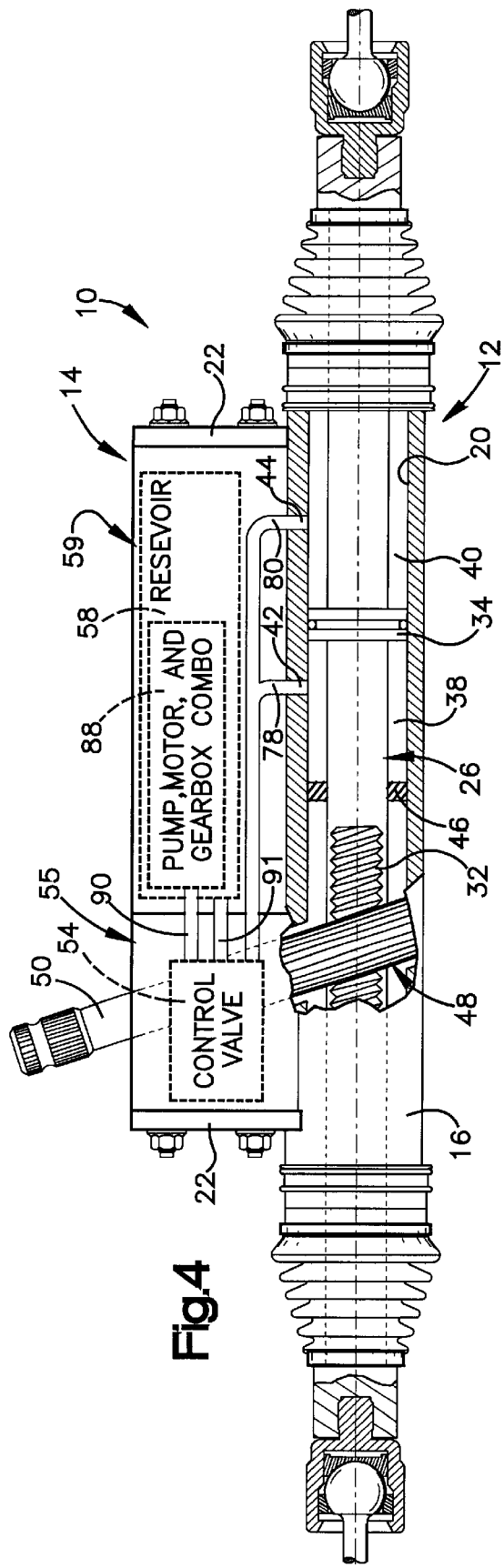
FIG. 4 schematically illustrates a second embodiment of an electric powered hydraulic steering system embodying the present invention.

FIG. 1 shows an electric powered hydraulic steering system 10 embodying the present invention. The system 10 includes a plurality of components which are assembled together in an integrated unit. The components include a power steering motor 12 and a fluid supply and control system 14 attached to the power steering motor 12.

The power steering motor 12 includes a cylindrical housing 18. The cylindrical housing 18 extends axially and includes an exterior surface 16 and an interior surface 20. Two flanges 22 extend radially outwardly from the exterior surface 16 of the housing 13 for attaching the fluid supply and control system 14 to the power steering motor 12. The interior surface 20 of the power steering motor housing 18 defines a cylindrical interior chamber 24 in the housing 18.

An axially extending, cylindrical rack bar 26 extends through the interior chamber 24 of the power steering motor housing 18. The rack bar 26 is connected to the steerable wheels (not shown) of the vehicle through tie rods 28, which connect to the ends of the rack bar 26 with ball joints 30. The rack bar 26 moves linearly through the interior chamber 24 of the housing 18. Movement of the rack bar 26 relative to the cylindrical housing 18 causes turning of the steerable wheels of the vehicle. An axially extending array of rack teeth 32 is disposed on one end of the rack bar 26.

A circular piston 34 is fixedly connected to the rack bar 26. The piston 34 extends radially outwardly from the cylindrical rack bar 26 toward the interior surface 20 of the housing 18. An annular ring 36 extends around the piston 34 to seal the piston 34 against the interior surface 20 of the housing 18. The piston 34 divides the interior chamber 24 into two variable volume chamber portions 38 and 40. The volume of each chamber portion 38 and 40 varies as the piston 34 moves linearly within the power steering motor housing 18. Each chamber portion 38 and 40 is hydraulically connected to and receives hydraulic fluid from the fluid supply and control system 14. When a differential pressure arises between the two chamber portions 38 and 40, the piston 34 will move linearly within the housing 18, and the volume of each chamber portion 38 and 40 will change until the pressure in the respective chamber portions 38 and 40 is equalized. For example, assuming that chamber portion 38 has a fluid pressure that is greater than the fluid pressure in chamber portion 40, the higher pressure of the chamber portion 38 will act on the piston 34 and cause the piston 34 to move. The piston 34 will move linearly until the differential pressure between the two chamber portions 38 and 40 is eliminated. As the piston 34 moves linearly, the second chamber portion 40 decreases in volume. As the second chamber portion 40 decreases in volume, a portion of the hydraulic fluid within the second chamber portion 40 is forced out of the second chamber portion 40. The hydraulic fluid forced out of the decreasing volume chamber portion 40 returns to the fluid supply and control system 14 as will be discussed in greater detail below.

The power steering motor housing 18 further has two ports 42 and 44 in fluid communication with the respective chamber portions 38 and 40. The port 42 extends from the exterior surface 16 of the housing 18 and communicates with the chamber portion 38. The port 44 extends from the exterior surface 16 of the housing 18 and communicates with the chamber portion 40.

The power steering motor 12 also includes at least three seals. A respective seal (not shown) is located on each axial end of the housing 18. The seals located on each axial end of the housing 18 extend from the housing 18 to the rack bar 26 and prevent hydraulic fluid from leaking from the interior chamber 24 of the housing 18 and/or dust and the like from entering the interior chamber 24. A third seal 46 is located within the housing 18 and seals the portion of the rack bar 26 having the rack teeth 32 from the remainder of the rack bar 26 that extends through the housing 18. The third seal 46 prevents hydraulic fluid leakage from the first chamber portion 38 to the area in the housing 18 where the rack teeth 32 are located. The third seal 46 is located in an area of the housing 18 where the rack bar 26 is cylindrical and does not have rack teeth 32, as shown in FIG. 1.

A pinion gear 48 is mounted on an end of an input shaft 50 which may be rotated by rotation of a steering wheel 52. The pinion gear 48 extends into the power steering motor housing 18. An opposite end of the input shaft 50 is connected to the vehicle steering wheel 52. The pinion gear 48 is in meshing engagement with the rack teeth 32 of the rack bar 26.

When the power steering motor 12 is not operational, rotation of the steering wheel 52 results in rotation of the pinion gear 48, and rotation of the pinion gear 48 causes the rack bar 26 to move linearly within the power steering motor housing 18. Thus, the pinion gear 48 enables the vehicle to be manually steered when the power steering motor 12 is not operational.

The fluid supply and control system 14 comprises a control valve 54, a pump 56, a reservoir 58, and an electric motor 60, each of which is shown schematically in FIG. 1. The control valve 54, pump 56, reservoir 58, and electric motor 60 may be of any suitable construction known in the art. The reservoir 58 provides fluid to the pump 56 and receives fluid back from the control valve 54. The reservoir 58 may include an expansion bladder (not shown) for allowing expansion of the fluid due to temperature fluctuations. The pump 56 draws hydraulic fluid from the reservoir 58 and supplies the fluid to the control valve 54. The electric motor 60 drives the pump 56. The electric motor 60 receives power from the vehicle battery via leads 62. The control valve 54 receives hydraulic fluid from the pump 56 and directs the hydraulic fluid into the chamber portions 38 and 40 of the power steering motor 12.

The control valve 54 is connected to the input shaft 50 and is actuated by the rotation of the vehicle steering wheel 52. As the vehicle steering wheel 52 is rotated, the input shaft 50 is rotated. The direction and amount of rotation of the input shaft 50 determines the amount of fluid the control valve 54 will direct to a respective one of the chamber portions 38 and 40 of the power steering motor 12.

If the control valve 54 directs fluid to chamber portion 38 the control valve will also receive hydraulic fluid from the chamber portion 40. If the control valve 54 directs fluid to chamber portion 40, the control valve will receive hydraulic fluid from the chamber portion 38. The control valve 54 directs the returned hydraulic fluid from chamber portions 38 and 40 to the reservoir 58.

As shown in FIG. 1, the fluid supply and control system 14 may also include a planetary gearbox 64 for transmitting power from the electric motor 60 to the pump 56.

Each component of the fluid supply and control system 14 has a housing. As shown in FIG. 1, the control valve 54 has a housing 55; the pump 56 has a housing 57; the reservoir 58 has a housing 59; the electric motor 60 has a housing 61; and the gearbox 64 has a housing 65. The separate housings 55, 57, 59, 61, and 65 are interconnected. Preferably, the separate housings 55, 57, 59, 61, and 65 are bolted together.

Each housing 55, 57, 59, 61, and 65 has a base portion with a concave bottom for mating with the power steering motor housing 18. FIG. 2 illustrates the base portion 68 with a concave bottom surface 70 of the pump housing 57. When the housings 55, 57, 59, 61, and 65 are bolted together, they extends axially over a length that equals the axial distance between the two flanges 22 extending from the power steering motor housing 18. The concave bottom surface of each housing 55, 57, 59, 61, and 65 has a radius of curvature that equals the radius of curvature of the exterior surface 16 of the power steering motor housing 18. The housings 55, 57, 59, 61, and 65 mount onto the exterior surface 16 of the power steering motor housing 18 such that the concave bottom surfaces of the housings 55, 57, 59, 61, and 65 rest on the exterior surface 16 of the power steering motor housing 18. When mounted on the power steering motor housing 18, the housings 55, 57, 59, 61, and 65 can be bolted to the flanges 22 extending from the power steering motor housing 18.

Bolts 72 extend completely through all of the housings 55, 57, 59, 61, and 65. The bolts 72 have threaded ends for receiving nuts 74. As shown in FIG. 2, each housing has axially extending through holes 76 for receiving the bolts 72. The bolts 72 extends through the flanges 22, and the nuts 74 are tightened onto the threaded ends of the bolts 72 for fastening the housings together on the power steering motor housing 18. Instead of having bolts 72 extending completely through each housing 55, 57, 59, 61, and 65, adjacent housings 55, 57, 59, 61, and 65 may have interlocking portions and the housings forming the axial ends of the fluid supply and control system 14 may be secured to the flanges 22 with bolts. Each housing 55, 57, 59, 61, and 65 may include a sealed access opening (not shown) on an outer surface to allow access into the respective housing.

Fluid lines for carrying fluid to the respective chamber portions 38 and 40 in the power steering motor 12 are formed in the respective housings 55, 57, 59, 61, and 65 forming the fluid supply and control system 14. FIG. 3 shows five fluid lines. Each fluid line extends at least partially through one of the respective housings 55, 57, 59, 61, and 65. The fluid lines are formed in the base portion of the respective housings 55, 57, 59, 61, and 65.

In FIG. 3, a first fluid line 78 connects the control valve 54 to the first access port 42 leading into the first chamber portion 38 of the power steering motor 12. The first fluid line 78 extends through a portion of both the control valve housing 55 and the electric motor housing 61 and extends completely through the pump housing 57 and the gearbox housing 65.

A second fluid line 80 connects the control valve 54 to the second access port 44 leading into the second chamber portion 40 of the power steering motor 12. The second fluid line 80 extends partially through the control valve housing 55 and the oil reservoir housing 59 and extends completely through the pump housing 57, the gearbox housing 65, and the electric motor housing 61.

A third fluid line 82 connects the control valve 54 back to the reservoir 58. The third fluid line 82 extends partially through the control valve housing 55 and the oil reservoir housing 59 and extends completely through the pump housing 57, the gearbox housing 65, and the electric motor housing 61.

A fourth fluid line 84 and a fifth fluid line 86 supply hydraulic fluid from the reservoir 58 to the pump 56 and from the pump 56 to the control valve 54, respectively. The fourth fluid line 84 extends partially through the oil reservoir housing 59 and the pump housing 57, and extends completely through the electric motor housing 61 and the gearbox housing 65. The fifth fluid line 86 extends partially through both the pump housing 57 and the control valve housing 55.

The fluid lines 78–86 preferably are gun-drilled into the base portion of the respective housings 55, 57, 59, 61, and 65. FIG. 2 shows the first, second, third and fifth fluid lines 78, 80, 82, and 86 formed in the base portion 68 of the pump housing 57.

The first fluid line 78 extends out of the electric motor housing 61 and connects to port 42 of the power steering motor housing 18. An O-ring seal (not shown) or a gasket (not shown) may be placed between two housings 18 and 61 to prevent fluid leaks.

The second fluid line 80 extends out of the oil reservoir housing 59 and connects to port 44 of the power steering motor housing 18. An O-ring seal (not shown) or a gasket (not shown) may be placed between two housings 18 and 59 to prevent fluid leaks.

Also, an O-ring or a gasket (not shown) may be placed between the various housings 55, 57, 59, 61, and 65 forming the fluid supply and control system 14 to prevent fluid leaks between the housings 55, 57, 59, 61, and 65.

A second embodiment of the power steering system 10 of the present invention is illustrated in FIG. 4. In the second embodiment, the pump 56, the gearbox 64, and the electric motor 61 are replaced by a submersible pump/motor/gearbox combination 88. The pump/motor/gearbox combination 88 is submersed in a oil reservoir 58. The oil reservoir housing 59 attached directly to the control valve housing 55. The two housings 55 and 59 are mounted to the power steering motor housing 18 in the same manner as described with regard to FIGS. 1–3. In the second embodiment, a discharge of the pump/motor/gearbox combination 88 connects via a fluid line 90 to the control valve 54. The fluid line supplies fluid to the control valve 54. The fluid line extends partially through the control valve housing 55 and partially through the oil reservoir housing 59. Another fluid line 91 returns fluid from the control valve 54 to the reservoir 58. Fluid line 91 also extends partially through the control valve housing 55 and partially through the oil reservoir housing 59. If a gearbox is not needed, a submersible pump/motor combination may be used in the second embodiment. The remainder of the power steering system 10 of the second embodiment is similar to the power steering system 10 of the first embodiment and as such, like numerals are used to indicate like parts.

Figure 5:
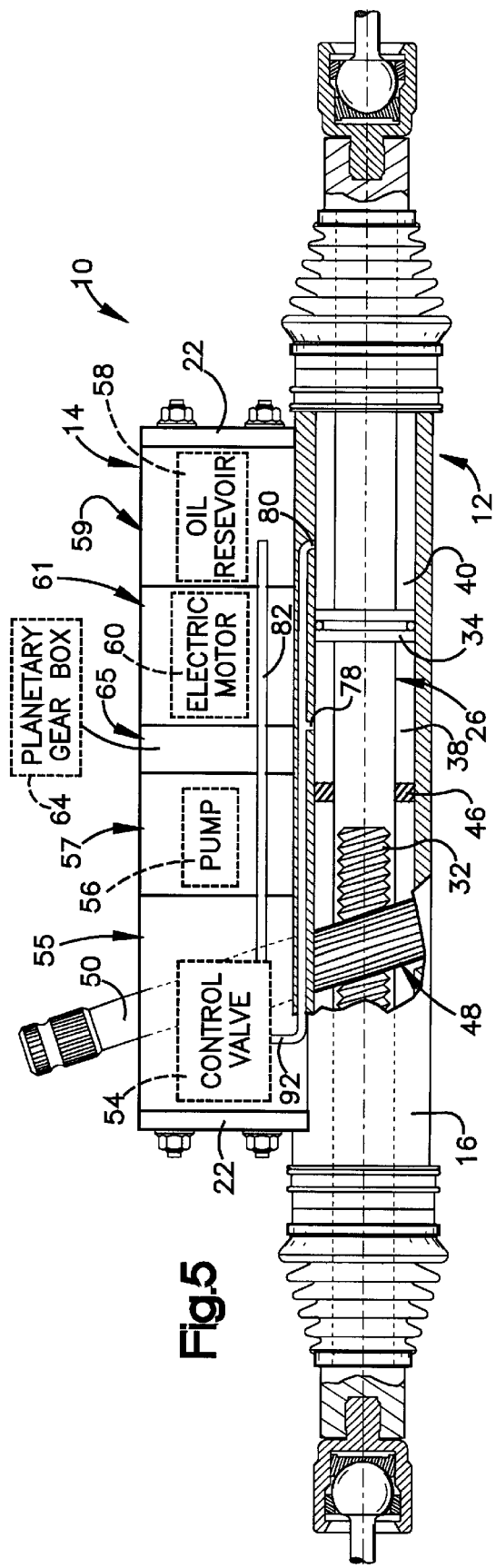
FIG. 5 schematically illustrates a third embodiment of an electric powered hydraulic steering system embodying the present invention.

As shown in FIG. 5, in a third embodiment of the power steering system 10 of the present invention, the fluid lines for carrying fluid to the respective chamber portions 38 and 40 of the power steering motor 12 are integral in the power steering motor housing 18. In this embodiment, the power steering motor housing 18 may include a radial extension (not shown) to provide sufficient structure for forming the fluid lines in the power steering motor housing 18. Preferably, the first and second fluid lines 78 and 80 are gun-drilled in the power steering motor housing 18. The control valve housing 55 will have two fluid lines 92 (one of which is shown) for supplying the hydraulic fluid from the control valve 54 to the appropriate fluid line 78 or 80 in the housing 18 of the power steering motor 12. Again, O-ring seals (not shown) or a gasket (not shown) may be placed between the control valve housing 55 and the power steering motor housing 18 to prevent leaks.

From the above description of the invention, those skilled in the art will perceive improvements, changes and modifications. For example, the power steering motor housing 18 and the fluid supply and control system 14 could be formed as one housing with means for accessing the various components within the housing. Such improvements, changes and modifications within the skill of the art are intended to be covered by the appended claims.

Having described the invention, the following is claimed:

1. An electric powered hydraulic steering system for a vehicle comprising:

a power steering motor having a housing with an exterior surface and an interior chamber, a rack bar for turning the steerable wheels of the vehicle extending through the interior chamber of the housing, and a piston attached to the rack bar and dividing the interior chamber into two chamber portions for receiving a fluid, the piston moving the rack bar linearly within the interior chamber depending upon a pressure differential between the two chamber portions; and an assembly mounted to the housing of the power steering motor, said assembly comprising:

a control valve for directing the fluid into the chamber portions in the housing of the power steering motor, a pump for supplying the fluid to the control valve, a reservoir for providing the fluid to the pump, and an electric motor for driving the pump.

2. The electric powered steering system of claim 1, wherein the power steering motor, control valve, pump, reservoir, and electric motor are an integrated unit.

3. The electric powered hydraulic steering system of claim 1 further comprising:

a gearbox interposed between the motor and the pump, the gearbox transmitting power from the motor to the pump.

4. The electric powered hydraulic steering system of claim 1 wherein:

the control valve, pump, reservoir, and electric motor form a fluid supply and control system, the fluid supply and control system being mounted on the housing of the power steering motor, the fluid supply and control system including fluid lines for carrying the fluid to the respective chamber portions in the housing of the power steering motor.

5. The electric powered hydraulic steering system of claim 2 wherein:

the housing of the power steering motor has ports communicating with the two chamber portions and with the fluid lines.

6. The electric powered hydraulic steering system of claim 1 further comprising:

ports for directing fluid to the respective chamber portions, at least one of the ports being in the housing of the power steering motor; and the assembly further including internal piping connecting to the ports.

7. The electric powered hydraulic steering system of claim 1 wherein:

the housing of the power steering motor includes two flanges extending outwardly from the exterior surface of the housing, the two flanges extending parallel to one another; and the assembly being interposed between and being secured to the two flanges.

8. An electric powered hydraulic steering system for a vehicle comprising:

a power steering motor having a housing with an exterior surface and an interior chamber, a rack bar for turning the steerable wheels of the vehicle extending through the interior chamber of the housing, and a piston attached to the rack bar and dividing the interior chamber into first and second chamber portions for receiving a fluid, the piston moving the rack bar linearly within the interior chamber in response to a pressure differential between the first and second chamber portions;

a control valve for directing fluid to the first and second chamber portions of the power steering motor, the control valve having a housing which is mounted to the exterior surface of the power steering motor housing; and a pump for supplying fluid from a fluid reservoir to the control valve, the pump being driven by an electric motor and the pump including a housing which is mounted to the exterior surface of the power steering motor housing.

9. The electric powered hydraulic steering system of claim 8 wherein the control valve housing and the pump housing each have a concave bottom surface for mating with the exterior surface of the power steering motor housing when the control valve housing and the pump housing are mounted to the power steering motor housing.

10. The electric powered hydraulic steering system of claim 9 wherein the concave bottom surface of the control valve housing and the concave bottom surface of the pump housing each have a radius of curvature that equals a radius of curvature of the exterior surface of the power steering motor housing.

11. The electric powered hydraulic steering system of claim 8 further including first and second fluid lines, the first fluid line providing fluid communication between the control valve and the first chamber portion of the power steering motor, the second fluid line providing fluid communication between the control valve and the second chamber portion of the power steering motor, the first and second fluid lines extending at least partially through the control valve housing and at least partially through the pump housing.

12. The electric powered hydraulic steering system of claim 11 wherein the first and second fluid lines are gun-drilled into the control valve housing and into the pump housing.

13. The electric powered hydraulic steering system of claim 8 wherein at least one flange extends radially outwardly from the exterior surface of the power steering motor housing, a plurality of holes extending completely through the control valve housing and the pump housing, each hole receiving a bolt, the bolt extending through the at least one flange and fastening the control valve housing and the pump housing to the power steering motor housing.

* * * * *